Figure 1:
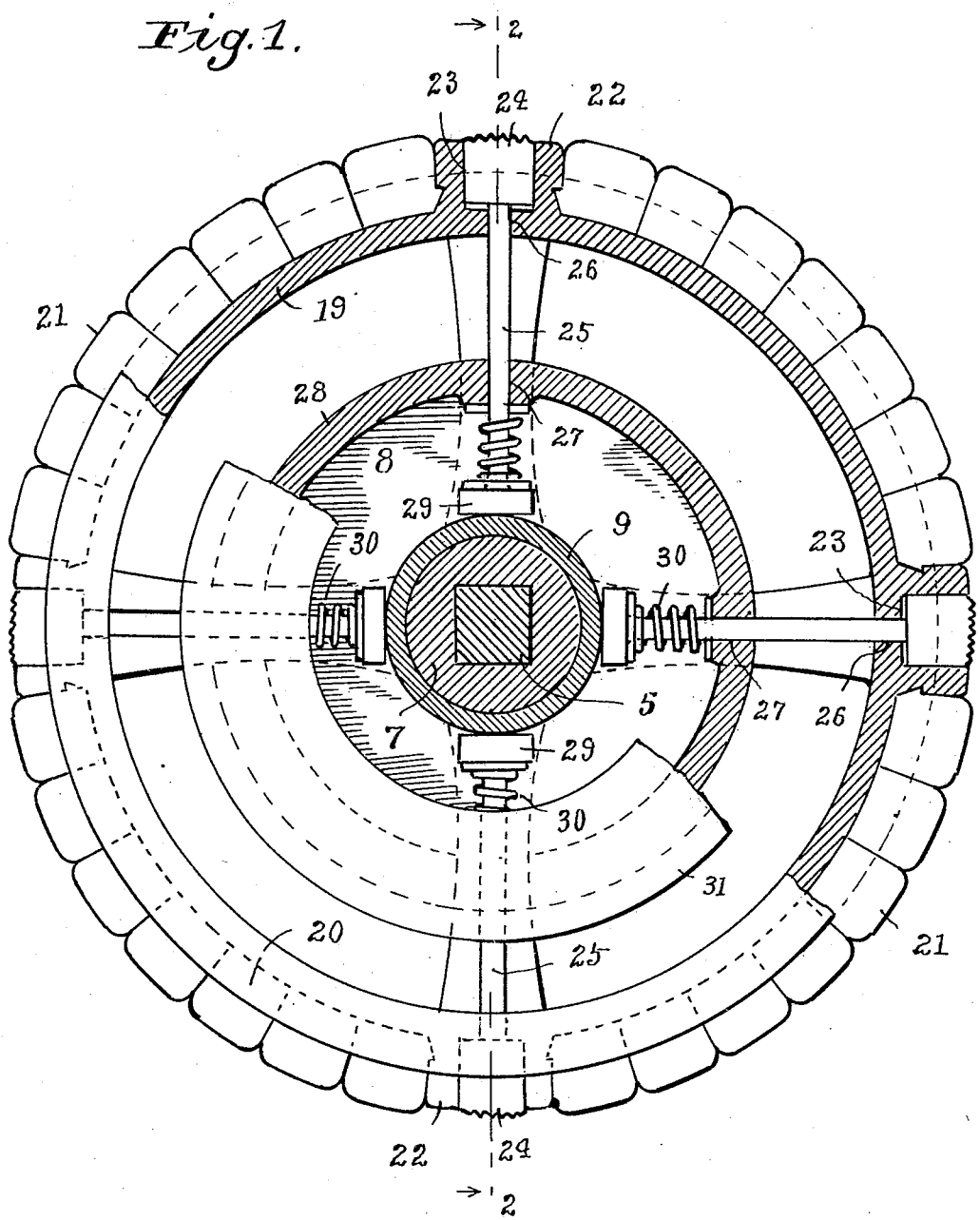

R. J. FARRELL.
NON-SKID WHEEL.
APPLICATION FILED MAR. 29, 1919.

1,389,822.

Patented Sept. 6, 1921.
2 SHEETS—SHEET 1.

Inventor
Richard J. Farrell

By Chamberlain & Newman
Attorneys

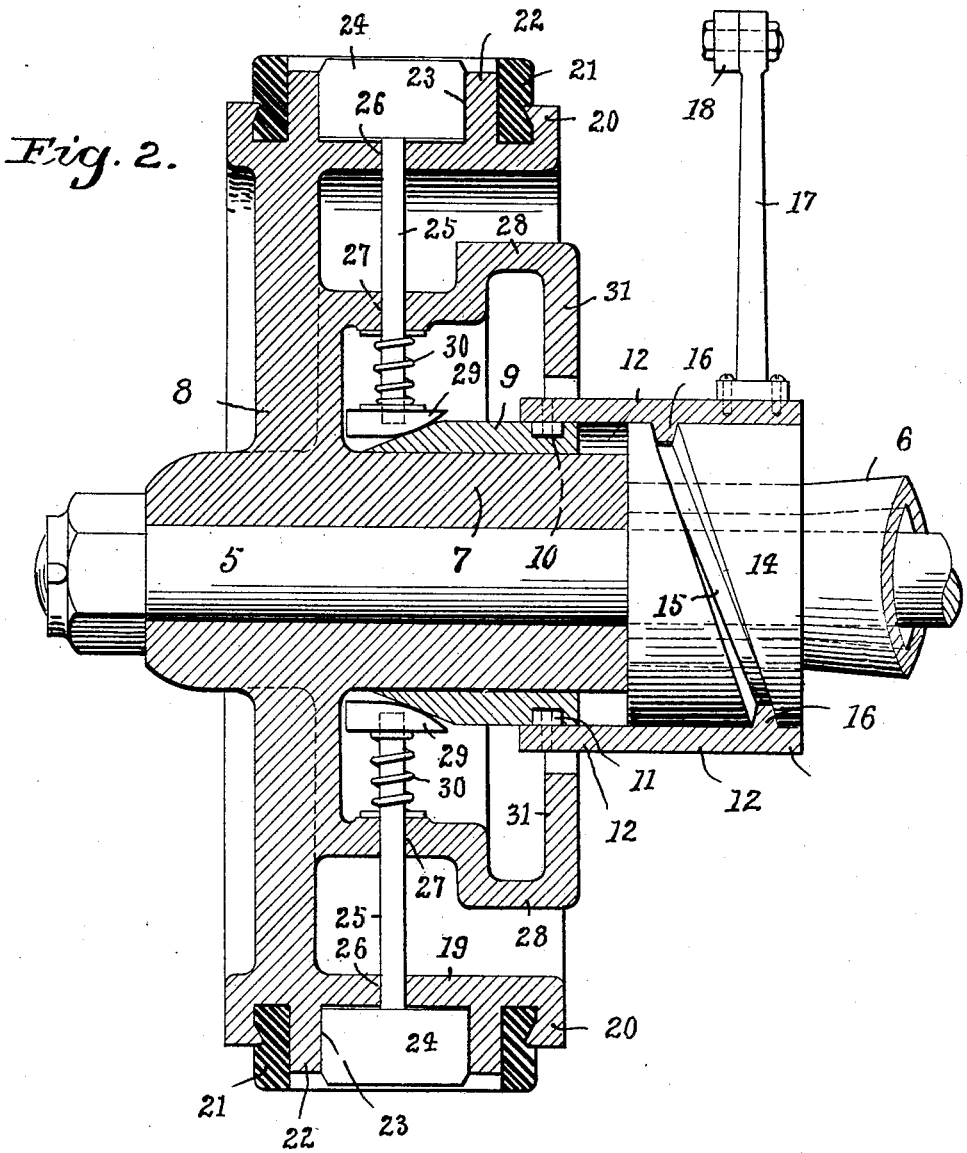

UNITED STATES PATENT OFFICE.

RICHARD J. FARRELL, OF PALMER, MASSACHUSETTS, ASSIGNOR OF ONE-THIRD TO MATHEW KARDES, OF WATERBURY, CONNECTICUT, AND ONE-THIRD TO JOSEPH BOLEWICZ, OF PALMER, MASSACHUSETTS.

NON-SKID WHEEL.

1,389,822.  Specification of Letters Patent.  Patented Sept. 6, 1921.

Application filed March 29, 1919. Serial No. 286,064.

*To all whom it may concern:*

Be it known that I, RICHARD J. FARRELL, a citizen of the United States, and resident of Palmer, in the county of Hampden and State of Massachusetts, have invented certain new and useful Improvements in Non-Skid Wheels, of which the following is a specification.

My invention relates to new and useful improvements in non-skid wheels for automobile trucks, tractors or other form of vehicles.

The object of the invention is to provide a wheel for the above purpose which may employ the usual sectional solid rubber tires, to provide means within the wheel, that can be extended from the periphery to form non-skid elements for the tire when desired and to arrange the same so that they can be extended the desired distance so as to be better adapted to different kinds of roads and weather conditions; further to provide means whereby the projections and mechanism for operating the same may be operated from the driver's seat and while the car is traveling over the road, and finally to provide a simple and inexpensive form of construction for the above purpose which while designed as a permanent part of the wheel, yet need only to be brought into use when the road conditions require it, and in the same sense that non-skid chains are employed.

With these and other objects in view the invention resides and consists in the construction and novel combination and arrangements of parts hereinafter more fully described, illustrated in the accompanying drawings, and pointed out in the claims hereto appended, it being understood that various changes in the form, proportion, size and minor details of construction within the scope of the claims may be resorted to without departure from the spirit or sacrificing any of the advantages of the invention.

Similar characters of reference denote like or corresponding parts throughout the several figures of the accompanying drawings forming a part of this specification, and upon which, Figure 1 shows a sectional side elevation of my improved form of non-skid truck wheel as seen when looking outward through the wheel, and Fig. 2 shows a central vertical cross-section of the wheel taken on line 2—2 of Fig. 1.

My improved non-skid device may be used singly as shown in the drawings, or as one of a pair of wheels, as is usually employed on heavy trucks, and in which case my non-skid wheel would be positioned upon the inside and a wheel of any other preferred style positioned adjacent to it on the outside, as suggested, however, and for the purpose of simplifying the illustration of the invention I have preferably shown my improved wheel alone as illustrated without a companion wheel as suggested.

In the drawings 5 represents the axle which as applied in this instance constitutes the driving member for the wheel and 6 represents the housing for inclosing the axle. The hub portion 7 of the wheel 8 may be secured to the outer end of the axle in any suitable manner and the peripheral surface of the inner portion of the hub is finished to accommodate a conical sleeve 9 which is slidably mounted thereon. This sleeve is provided with an annular groove 10 for the engagement of the rolls 11 carried upon the arms 12 attached to the rocker member 13 mounted upon the cam 14. The cam is secured to the housing 6 and is provided with a spiral groove 15 in which the spline 16 on the inside of the rocker member engages. The arm 17 that is secured to the rocker member extends outward and has one end of the rod 18 pivotally connected thereto and to the other end of which an operating member, of any improved design, may be connected in a way to shove the rod forward or backward for the purpose of turning the rocker member upon the cam and thereby to move the conical sleeve in or out.

The wheel further includes a rim portion 19 having flanges 20 upon its inner and outer sides and between which the solid rubber sections 21 are secured in any desired manner. I form a series of enlargements 22 upon the periphery of the rim and in each is provided a pocket 23 to accommodate an adjustable lug 24 having a stem 25 that is fitted in the radial holes 26 of the rim and 27 of the brake drum 28. Upon the inner end of each of these stems is secured a shoe 29 having an inclined inner surface to engage the conical peripheral surface of the sleeve 9. Springs 30 are mounted upon the inner portion of the stems, and have one end seated on the outer side of the shoes and the other end against the inner surface of the brake drum, so as to normally hold the lugs down in their pockets and the shoes against the conical surface of the sleeve so as to normally hold the outer surface of the lugs slightly below the outer surface of the rubber sections. The flange 31 formed on the brake drum serves to inclose the mechanism and protect the same from dirt.

From the foregoing it will be clearly apparent that with a proper operation of the connecting rod the rocker member, conical sleeve, shoes, stems and lugs will be forced outward to project the lugs beyond the surface of the solid rubber tire so as to form non-skid elements that will insure proper engagement of the wheel with the road and prevent sidewise movement. The size and shape of the stems as well as the lugs and shoes may be varied to best suit the particular size and style of the wheel without departing from the spirit of the invention.

Having thus described my invention, what I claim and desire to secure by Letters Patent, is—

1. In a non-skid wheel of the character described, the combination of a wheel having a hub and rim portion and pockets forward in the rim, adjustable lugs snugly fitting said pockets and having stems extending through radial holes in said rim, springs for normally holding said adjustable lugs seated against the rim, and means for causing the lugs to leave their seats against the rim and to become extended from the periphery of the wheel.

2. In a non-skid wheel of the character described, the combination of a wheel having a hub and rim portion and pockets formed in the rim, adjustable lugs snugly fitting said pockets and having stems extending through radial holes in said rim, springs for normally holding said adjustable lugs seated against the rim, and means for causing the lugs to leave their seats against the rim while still engaging the walls of the pocket and to become extended from the periphery of the wheel.

Signed at Bridgeport in the county of Fairfield and State of Connecticut this 28th day of March, A. D., 1919.

RICHARD J. FARRELL.

Witnesses:
C. M. NEWMAN,
LILLIAN M. ALLING.